(No Model.)

D. R. DODGE.
WHEEL PLOW.

No. 278,519. Patented May 29, 1883.

Witnesses:
C. W. Johnson
W. B. Hale

Daniel R. Dodge,
Inventor

Attorney.

UNITED STATES PATENT OFFICE.

DANIEL R. DODGE, OF NILES, MICHIGAN.

WHEEL-PLOW.

SPECIFICATION forming part of Letters Patent No. 278,519, dated May 29, 1883.

Application filed March 1, 1883. (No model.)

*To all whom it may concern:*

Be it known that I, DANIEL R. DODGE, a citizen of the United States of America, residing at Niles, in the county of Berrien and State of Michigan, have invented certain new and useful Improvements in Wheel-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to sulky gang-plows, its object being to provide adjustments for the several plows of an implement of this class, whereby the depth and distance apart of furrows can be easily regulated at will, and the implement can be placed readily in condition for working the field or traveling upon a road with the plows clear of the ground.

The invention consists in certain novel constructions and combinations of devices, which will be hereinafter particularly described, and pointed out in the claims.

Figure 1:
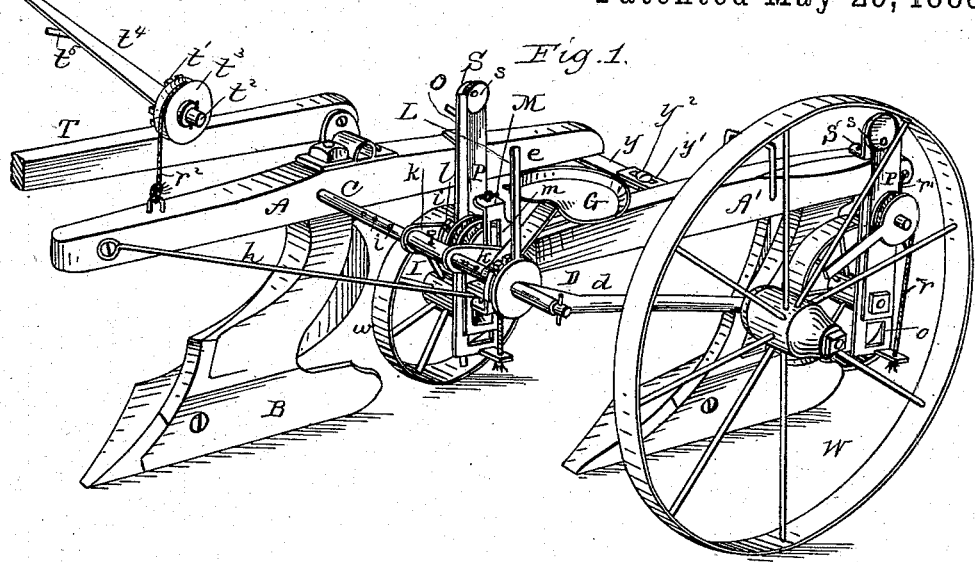
Figure 2:
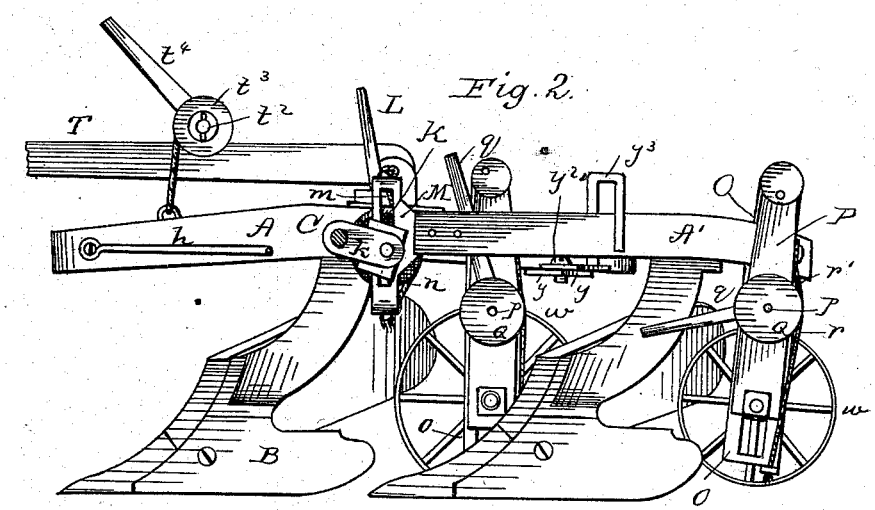
Figure 3:
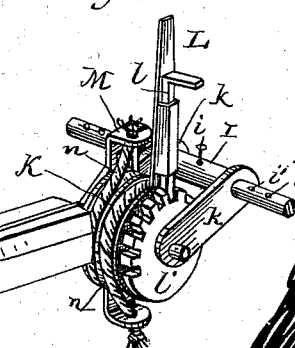

In the accompanying drawings, Figure 1 is a perspective view of a sulky gang-plow constructed according to my invention. Fig. 2 is a longitudinal section taken on a plane between the driver's seat and rear plow-beam. Fig. 3 is a perspective view, illustrating the devices for raising and lowering the front end of the rear plow-beam and adjusting the same laterally.

The letter A indicates the front plow-beam, having the plow B attached thereto in the usual manner. From the side of this beam corresponding to the landside of the plow projects a cylindrical cross-bar, C, upon the outer end of which is a sleeve, D, from which extends rearwardly an arm, $d$, carrying the spindle upon which is mounted the traveling wheel W. From the inner end of the sleeve D projects a handle, $e$, upon one side of which is arranged a sliding latch adapted to engage with a toothed segment fixed upon the cross-bar C. By adjusting this handle forward or rearward it will be seen that the outer end of the cross-bar C will be correspondingly raised or lowered for leveling the implement.

G is the driver's seat, supported on the cross-bar C; and $h$ is a brace-bar, extending between said cross-bar and the front portion of the front plow-beam.

Upon the cylindrical cross-bar C, between the driver's seat and the front plow-beam, is arranged a sleeve, I, which may be adjusted longitudinally and held in place by means of a pin, $i$, which passes through diametrically-opposite apertures in the sleeve and either of a series of holes, $i'$, through the bar C. From the opposite ends of the sleeve I project short arms $k$, between the outer extremities of which is pivoted the double-grooved pulley K, from one side of which projects a handle-lever, L, provided with a sliding latch, $l$, to engage a toothed segment, $l'$, fixed upon one of the arms $k$.

A' designates the rear plow-beam, to the front end of which is secured a plate, M, having a vertical slot, $m$, which embraces the pivot-pin of the double pulley K.

To the periphery of one sheave of the double pulley is secured a cord, $n$, which passes partly around said sheave, and has its outer end secured to the lower end of the slotted plate M. To the other sheave of the double pulley is similarly attached a cord, $n'$, which passes upward partly around the sheave, and has its outer end attached to the upper end of said slotted plate M. It will be seen that by adjusting the handle-lever L either forward or rearward the front end of the rear plow-beam will be correspondingly raised or lowered through the pulley and its cord acting upon the plate M, which is guided and held by the pivot-pin, which passes through its slot.

To the rear end of each of the plow-beams is secured a slotted hanger, O, and upon one side of this slotted hanger is arranged a sliding bar, P, from the lower end of which a spindle projects through the slot in the hanger, and has mounted upon it a plow-wheel, $w$. From the bar P projects a pin, $p$, upon which is mounted a double pulley, Q, having a radially-projecting handle-arm, $q$.

To the upper portion of the periphery of one of the sheaves of the double pulley Q is secured a cord, $r$, which passes downward partially around the sheave, and has its lower end attached to the lower end of the hanger O. To the lower portion of the periphery of the other sheave of the pulley is secured one end of a cord, $r'$, which passes upward partially around the sheave, and has its outer end secured to the rear end of the plow-beam. Upon the top of the rear end of the plow-beam is fixed a bracket, S, upon one side of which is eccentrically pivoted a circular plate, $s$, a portion of the periphery of which fits in a segmental notch formed in the top of the bar P. It will now be observed that by turning the handle-arm $q$ forward or rearward the sliding bar P and connected wheel $w$ will be raised or lowered by means of the pulley Q and its cords, according to the direction which the arm $q$ is moved, and the eccentric $s$ will adjust itself correspondingly to the rise and fall of the bar P, and serves as an adjustable stop to prevent the upper end of said bar from moving either forward or rearward. The main object of the adjustable bar P and its connected devices is to regulate the depth of cut of the plow, and they are also used in connection with the adjusting devices at the forward end of the beam for raising the plow clear of the ground.

The letter T designates the draft-beam, the rear end of which is pivotally connected to the front plow-beam about midway its length, and upon this draft-beam is fixed a bracket, $t$, carrying a toothed segment, $t'$, and having a projecting pin, $t^2$, upon which is mounted a grooved pulley, $t^3$, having a projecting handle-arm, $t^4$, provided with a sliding latch, $t^5$, arranged to engage the teeth of the segment $t'$.

To the upper portion of the periphery of the pulley $t^3$ is secured one end of a cord, $r^2$, which passes downward partially around the pulley, and has its lower end secured to the front portion of the front plow-beam. By moving the handle-arm $t^4$ forward or rearward the front end of the front plow-beam may be either raised or lowered, as desired, the latch $t^5$ holding it in position as adjusted.

From the rear end of the front plow-beam an arm, $y$, projects inwardly, and upon this arm is arranged a sliding plate, $y'$, slotted longitudinally and adjustably secured to the arm by means of a set-screw, $y^2$, which passes through the slot in the plate and a screw-hole in the arm. To the inner end of the sliding plate is secured a hook, $y^3$, which takes over and embraces the rear plow-beam, the object of this hook being to prevent the plow-beam from swinging laterally and cause the furrow formed by the plow to be always parallel with that made by the forward plow. In order to adjust the rear plow-beam so that the furrow formed by its plow may be either closer to or farther from that formed by the front plow, it is only necessary to loosen the screw $y^2$, so that the plate $y'$ may slide, and then remove the pin $i$, which secures the sleeve 1 to the cross-bar C. The sleeve may be then moved in a desired direction, and again secured by inserting the pin in a fresh hole in the cross-bar. The sliding plate $y'$ is then properly adjusted, so that the hook $y^3$ will hold the rear plow-beam straight.

Having now fully described the construction and operation of my invention, what I claim is—

1. The combination, with the front plow-beam, A, the projecting cross-bar C, and the rear plow-beam, of the adjustable sleeve I, connected with the front end of the rear plow-beam, substantially as described.

2. The combination, with the front plow-beam and rear plow-beam and cross-bar C, of the adjustable sliding sleeve I, connected with the front end of the rear plow-beam, and the adjustable hook $y^3$, embracing said rear plow-beam, substantially as described.

3. The combination, with the cross-bar C and the adjustable sliding sleeve I, having rearwardly-projecting arms, of the double pulley mounted between said arms, the slotted plate secured to the front end of the rear plow-beam and embracing the pivot-pin of the pulley, the cords secured to said pulley, and the upper and lower ends, respectively, of the slotted plate, and suitable means for adjusting said pulley, substantially as described.

4. The combination, with the plow-beam, of the slotted hanger O, the sliding bar P, carrying a spindle projecting through the slot of said hanger, and having the plow-wheel $w$ mounted thereon, the double pulley mounted on said sliding bar P, the cords secured to said pulley and to the lower end of the hanger and to the rear end of the plow-beam, respectively, and suitable means for operating said pulley, substantially as described.

5. The combination, with the sliding bar P, having the segmental notch in its upper end, of the loosely-pivoted eccentric $s$, substantially as and for the purpose set forth.

In testimony whereof I affix my signature in presence of two witnesses.

DANIEL R. DODGE.

Witnesses:
H. METCALF,
GEO. S. CLAPP.